United States Patent
Okada et al.

(10) Patent No.: US 8,197,972 B2
(45) Date of Patent: Jun. 12, 2012

(54) ALL-SOLID-STATE CELL

(75) Inventors: Shigeto Okada, Fukuoka (JP); Eiji Kobayashi, Fukuoka (JP); Kazuhiro Yamamoto, Nagoya (JP); Toshihiro Yoshida, Nagoya (JP)

(73) Assignees: Kyushu University, Fukuoka (JP); NGK Insulators, Ltd., Nagoya (JP)

( * ) Notice: Subject to any disclaimer, the term of this patent is extended or adjusted under 35 U.S.C. 154(b) by 567 days.

(21) Appl. No.: 12/372,821

(22) Filed: Feb. 18, 2009

(65) Prior Publication Data

US 2009/0214957 A1  Aug. 27, 2009

(30) Foreign Application Priority Data

Feb. 22, 2008 (JP) ................................. 2008-041502
Jan. 21, 2009 (JP) ................................. 2009-010656

(51) Int. Cl.
*H01M 10/0562* (2010.01)

(52) U.S. Cl. ........ 429/304; 429/305; 429/319; 429/321; 429/322

(58) Field of Classification Search ........................ None
See application file for complete search history.

(56) References Cited

U.S. PATENT DOCUMENTS

| | | | |
|---|---|---|---|
| 6,355,379 B1 | 3/2002 | Ohshita et al. | |
| 2006/0078790 A1 | 4/2006 | Nimon et al. | |
| 2007/0048619 A1* | 3/2007 | Inda | 429/322 |
| 2007/0172739 A1 | 7/2007 | Visco et al. | |
| 2007/0175020 A1 | 8/2007 | Nagata et al. | |
| 2007/0259271 A1 | 11/2007 | Nanno et al. | |

FOREIGN PATENT DOCUMENTS

| | | |
|---|---|---|
| EP | 1 826 860 A1 | 8/2007 |
| EP | 1 826 861 A1 | 8/2007 |
| JP | 08-138724 A1 | 5/1996 |
| JP | 2000-311710 A1 | 11/2000 |
| JP | 2005-063958 A1 | 3/2005 |
| JP | 2008-226463 | 9/2008 |
| WO | 2007/075867 A2 | 7/2007 |
| WO | 2007/075867 A3 | 7/2007 |

OTHER PUBLICATIONS

U.S. Appl. No. 12/267,659, filed Nov. 10, 2008, Okada et al.
U.S. Appl. No. 12/267,668, filed Nov. 10, 2008, Okada et al.
Yusuke Fukushima et al., "Fabrication of Electrode-Electrolyte Interface in All-Solid-State Lithium Batteries Using the Thermal Softening-Adhesion Behavior of $Li_2S-P_2S_5$ Glass Electrolytes," Lecture Summary of Chemical Battery Material Association Meeting, vol. 9, Jun. 11, 2007, pp. 51-52.

\* cited by examiner

*Primary Examiner* — Patrick Ryan
*Assistant Examiner* — Wyatt McConnell
(74) *Attorney, Agent, or Firm* — Burr & Brown

(57) ABSTRACT

A first paste for a first electrode layer and a second paste for a second electrode layer are printed on a fired solid electrolyte by screen printing, etc. to form electrode patterns for forming the first electrode layer and the second electrode layer. The first and second pastes can be prepared by dissolving a binder in an organic solvent, adding an appropriate amount of the obtained solution to powders of an electrode active substance material and a solid electrolyte material, and kneading the resultant mixture. The first and second pastes are applied to the fired solid electrolyte to form a cell precursor, the cell precursor is placed in a hot press mold subjected to a thermal treatment while pressing from above by a punch, whereby the first and second electrode layer are formed from the first and second pastes.

27 Claims, 14 Drawing Sheets

ALL-SOLID-STATE CELL

CROSS-REFERENCE TO RELATED APPLICATIONS

This application is based upon and claims the benefit of priority from Japanese Patent Application No. 2008-041502 filed on Feb. 22, 2008 and Japanese Patent Application No. 2009-010656 filed on Jan. 21, 2009 in the Japanese Patent Office, of which the contents are incorporated herein by reference.

BACKGROUND OF THE INVENTION

1. Field of the Invention

The present invention relates to an all-solid-state cell utilizing a combination of an electrode active substance and a solid electrolyte.

2. Description of the Related Art

In recent years, with the advancement of portable devices such as personal computers and mobile phones, there has been rapidly increasing demand for batteries usable as a power source thereof. In cells of the batteries for the purposes, a liquid electrolyte (an electrolytic solution) containing a combustible organic diluent solvent has been used as an ion transfer medium. The cell using such an electrolytic solution can cause problems of solution leakage, ignition, explosion, etc.

In view of solving the problems, all-solid-state cells, which use a solid electrolyte instead of the liquid electrolyte and contain only solid components to ensure intrinsic safety, have been developing. The all-solid-state cell contains a sintered ceramic as the solid electrolyte, and thereby does not cause the problems of ignition and liquid leakage, and is hardly deteriorated in battery performance by corrosion. Particularly all-solid-state lithium secondary cells can achieve a high energy density easily, and thus have been actively studied in various fields (see, for example, Japanese Laid-Open Patent Publication Nos. 2000-311710 and 2005-063958, Yusuke Fukushima and four others, *"Fabrication of electrode-electrolyte interface in all-solid-state lithium batteries using the thermal softening-adhesion behavior of $Li_2S$—$P_2S_5$ glass electrolytes"*, Lecture Summary of Chemical Battery Material Association Meeting, Vol. 9th, Pages 51-52, issued on Jun. 11, 2007).

Japanese Laid-Open Patent Publication No. 2005-063958 discloses a thin-film, solid, lithium ion secondary cell. The secondary cell described in Japanese Laid-Open Patent Publication No. 2005-063958 is a bendable thin-film cell having a flexible solid electrolyte and thin layers of positive and negative electrode active substances sputtered thereon. The electrodes of the cell have to be thin, and the amounts of the electrode active substances are limited. Thus, the cell is disadvantageous in that it is difficult to achieve a high capacity.

The article of Fukushima et al. reports formation of an electrode-electrolyte interface of a complex of a glass electrolyte and an electrode active substance, utilizing softening fusion of the glass electrolyte. In this report, it is described that the resistance between electrolyte particles is effectively lowered due to the fusion of the glass electrolyte, and further a heterophase is not formed in a reaction between the electrolyte material and the active substance material.

However, an all-solid-state cell having positive and negative electrodes is not described in this report, and it is unclear whether the reaction resistance can be lowered in the electrolyte-electrode active substance interface. Further the relation between the electric properties and the fact that the heterophase is not formed is not specifically described, and the charge-discharge ability of the all-solid-state cell is unknown. Furthermore, the electrolyte used in this report is a sulfide, which is expected to be unstable in the atmosphere (air). The electrolyte may generate a toxic gas when brought into contact with the air due to breakage or the like. Thus, this technology is disadvantageous in unestablished safety.

SUMMARY OF THE INVENTION

The internal resistance of a cell is partly due to an interface between an electrode active substance and a solid electrolyte. A resistance against transfer of electrons and Li ions through the interface during charge and discharge is hereinafter referred to as an interface reaction resistance. The present invention relates to a technology for lowering the interface reaction resistance in an all-solid-state cell system using a solid electrolyte.

For example, in the conventional lithium ion cell using the electrolytic solution, the electrolyte is a liquid containing an organic solvent, though the electrode active substance is a solid. Therefore, the electrolyte can readily penetrate between particles of the electrode active substance to form an electrolyte network in the electrode layers, resulting in a low interface reaction resistance.

In terms of the interface reaction resistance according to the present invention, a reaction resistance per unit area of connected particles largely depends on the combination of the active substance material and the electrolyte material used. As the connection area between the particles is increased, the interface reaction resistance of the entire cell is lowered and the internal resistance is lowered such that resistances are parallel-connected in a view of an equivalent circuit. Thus, the interface reaction resistance between the electrolyte and the active substance can be lowered by (1) selecting the material combination in view of smoothly transferring the Li ions and (2) increasing the connection interface area between the electrolyte and the active substance per an electrode capacity.

In the present invention, a combination of an electrode active substance and a solid electrolyte containing a common polyanion or a combination of a phosphate electrode active substance and a solid electrolyte is used in view of the process of (1), and a solid electrolyte is mixed with an electrode active substance to form a network in an electrode layer, whereby the connection interface area between the electrode active substance and the solid electrolyte is remarkably increased to lower the interface reaction resistance in view of the process of (2).

Japanese Laid-Open Patent Publication No. 2000-311710 discloses a solid electrolyte cell containing a solid electrolyte material of an inorganic oxide, which forms a three-dimensional network between particles of an electrode active substance. Thus, the inventors have selected the combination of the phosphate electrode active substance and the solid electrolyte containing a common polyanion as the combination suitable for smoothly transferring the Li ions, and have produced an all-solid-state cell having electrodes containing the solid electrolyte between the electrode active substance particles. However, because the solid electrolyte was fired in the state of a mixture with the electrode active substance in the electrode layer, the electrolyte was reacted with the electrode active substance, so that reduction in the peak intensity of the electrode active substance and formation of a heterophase were found in an XRD (X-ray diffraction) observation. The active substance in this state was subjected to a charge-discharge ability measurement using an ideal system containing an electrolytic solution. As a result, the charge-discharge capacity of the active substance was extremely reduced, and the active substance was incapable of charge and discharge at its original theoretical capacity. Thus, the capacity of the electrode active substance per se was lowered.

Then, the inventors have lowered the firing temperature to prevent the reaction between the electrode active substance and the solid electrolyte. However, the solid electrolyte particles were not sufficiently sintered, the particle boundary resistance between the solid electrolyte particles was increased, and the connection interface area between the electrode active substance and the solid electrolyte was not increased. As a result, both the particle boundary resistance of the solid electrolyte particles and the interface reaction resistance of the electrode active substance and the solid electrolyte could not be lowered, whereby the resultant all-solid-state cell had no charge-discharge capacity (no charge-discharge ability).

In view of the above problems, an object of the present invention is to provide such an all-solid-state cell that the particle boundary resistance of a solid electrolyte particles can be lowered in an electrode layer while preventing capacity reduction due to a reaction of the solid electrolyte with an electrode active substance, a network of the solid electrolyte can be formed in the electrode layer, the connection interface area between the solid electrolyte and the electrode active substance can be remarkably increased to lower the interface reaction resistance, and thus charge and discharge can be carried out even in the all solid state.

Another object of the present invention is to provide an all-solid-state cell having the above described effects and improved battery properties.

In research of an all-solid-state cell having an electrode structure composed of a mixture of a solid electrolyte material and an electrode active substance material, the inventors have found that the charge-discharge capacity of the electrode active substance material is reduced below its original theoretical capacity due to reduction in the crystallinity of the electrode active substance material and formation of a heterophase by a reaction between the electrode active substance and the solid electrolyte. Based on this finding, the inventors have further found that, when a combination of the materials satisfies the inequality Ty>Tz (in which Ty is a temperature at which the capacity of the electrode active substance is lowered by the reaction, and Tz is an initiation temperature at which the solid electrolyte is shrunk by firing), an electrolyte network can be formed in the electrode layer to lower the resistance within the temperature range of Tz to Ty, the connection area between the materials can be increased while preventing the reaction between the electrode active substance and the solid electrolyte, and the interface reaction resistance at the connection interface between the materials can be lowered, whereby the resultant all-solid-state cell has a low internal resistance.

In the present invention, a combination of a phosphate electrode active substance and a solid electrolyte containing a common polyanion may be selected as the combination suitable for smoothly transferring Li ions, and a solid phosphate electrolyte material may be vitrified. In a specific example, a Nasicon type LAGP having a relatively higher ion conductivity among phosphate compounds was vitrified, and the resultant solid electrolyte material had low transition temperatures, Tg (glass transition point) of approximately 480° C. and Tx (crystallization temperature) of approximately 590° C. (see FIG. 3). This glass material had a firing shrinkage initiation temperature of 550° C. to 600° C. Then, the reactivity between this vitrified solid electrolyte and the electrode active substance was evaluated, and crystallinity reduction and heterophase formation were not observed even at a temperature sufficiently higher than the firing shrinkage initiation temperature. Thus, the novel combination of the phosphate compound materials containing the common polyanion satisfied the relation of Ty>Tz.

As a result, the inventors found a condition for preventing the deterioration of the charge-discharge ability of the electrode active substance due to the reaction between the electrode active substance and the solid electrolyte while maintaining sufficient connection of the solid electrolyte particles. The above problems were solved based on this finding.

By using such materials for forming the mixture electrode layer of the all-solid-state cell, the particle boundary resistance between the solid electrolyte particles could be lowered while preventing the reduction in the capacity of the electrode active substance, and the electrolyte network could be formed in the electrode layer. Therefore, the connection interface area between the electrode active substance and the solid electrolyte could be remarkably increased to lower the interface reaction resistance, and thus the resultant all-solid-state cell was capable of charge and discharge operations even in the all solid state. Further, the inventors have found that, when the mixture of the electrode active substance and the solid electrolyte is fired under an applied pressure, the resultant electrode portion has an internal resistance 1-digit lower than that of an electrode portion formed without applying the pressure. Particularly, the electrode portion has an interface charge transfer resistance (a resistance at the interface between the active substance and the electrolyte) approximately 2-digits lower than that of the conventional electrode portion. It is conceivable that densification of the electrode portion is accelerated by the firing under the applied pressure, whereby the interface area between the active substance and the electrolyte is further increased utilizing the surface area of the active substance particles more effectively.

Thus, an all-solid-state cell according to a first aspect of the present invention comprises positive and negative electrode portions containing an electrode active substance, an electrolyte portion containing a solid electrolyte, and positive and negative collector portions, and wherein one or both of the positive and negative electrode portions are formed by firing a mixture of the electrode active substance and the solid electrolyte under an applied pressure.

The mixture may be fired under an applied pressure by a hot isostatic pressing (HIP) method including subjecting the mixture to a thermal treatment at a high temperature while applying an isotropic pressure, or by a hot pressing method including placing the mixture in a mold and subjecting the mold to a thermal treatment while uniaxially pressing. In the HIP method, a gas of argon, etc. is used as a pressure medium for applying the isotropic pressure to the mixture.

An all-solid-state cell according to a second aspect of the present invention comprises positive and negative electrode portions containing an electrode active substance, an electrolyte portion containing a solid electrolyte, and positive and negative collector portions, and wherein one or both of the positive and negative electrode portions are formed by firing a mixture of the solid electrolyte and the electrode active substance under an applied pressure, and the solid electrolyte and the electrode active substance satisfy the inequality Ty>Tz (in which Ty is a temperature at which the capacity of the electrode active substance is lowered by a reaction between a solid electrolyte material and an electrode active substance material, and Tz is a temperature at which the solid electrolyte material is shrunk by firing).

Specifically, Tz is a temperature at which the relative density of the solid electrolyte material is increased to 70% or more of the theoretical density thereof due to the firing shrinkage. Also, Tz is preferably a temperature at which the relative density of the material is increased to 80% or more due to the firing shrinkage within the temperature range of Ty>Tz.

Specifically, Ty is a temperature at which the charge-discharge capacity of the electrode active substance is lowered below 50% of the original theoretical capacity thereof. Ty is preferably a temperature at which the charge-discharge capacity of the electrode active substance is 80% or more of the theoretical capacity within the temperature range of Ty>Tz.

In the first and second aspects of the present invention, the electrode portion may be formed by mixing and firing the solid electrolyte material and the electrode active substance material, and the solid electrolyte material may contain an amorphous polyanion compound. Alternatively, the electrode portion may be formed by mixing and firing the solid electrolyte material and the electrode active substance material, and the solid electrolyte material may contain an amorphous phosphate compound.

The solid electrolyte material may be of Nasicon type after the firing.

Both the solid electrolyte material and the electrode active substance material may be of Nasicon type after the firing.

Furthermore, both the solid electrolyte material and the electrode active substance material may be of Nasicon type after the firing, the solid electrolyte material may contain LAGP $Li_{1+x}Al_xGe_{2-x}(PO_4)_3$ ($0 \leq x \leq 1$), the electrode active substance material may contain LVP $Li_mV_2(PO_4)_3$ ($1 \leq m \leq 5$) in both the positive and negative electrode portions, and thus the all-solid-state cell may have a symmetrical structure.

The electrolyte portion may be formed by firing the solid electrolyte material, which may contain an amorphous polyanion compound.

The electrolyte portion may be formed by firing the solid electrolyte material, which may contain an amorphous phosphate compound.

The inventors have further found that the battery properties of the all-solid-state cell depend on the oxygen density of the firing atmosphere. When the firing is started under an oxygen-containing atmosphere, the battery properties are improved. However, when the firing is carried out while maintaining a high oxygen density, the active substance material (LVP) generates a heterophase.

Thus, the battery properties can be improved by starting the process of firing the mixture under an oxygen-containing atmosphere.

The generation of the heterophase in the active substance material can be prevented by performing the process of firing the mixture under a firing atmosphere with variable oxygen density.

One or both of the positive and negative electrode portions may be formed by firing a printing paste containing the mixture. In this case, the electron conductivity of the electrode portion can be improved without intentional addition of a carbon component useful as an electron conducting aid. A binder contained in the printing paste may be carbonized, and the carbonized residue may act to improve the electron conductivity. The binder may act to improve the electron conductivity of the active substance or the electrolyte when decomposed.

As described above, in the all-solid-state cell of the present invention, the particle boundary resistance between the solid electrolyte particles can be lowered while preventing the reduction in the capacity of the electrode active substance in the electrode layer.

In the present invention, the electrolyte network can be formed in the electrode layer, the connection interface area between the electrode active substance and the solid electrolyte can be remarkably increased, the interface reaction resistance can be lowered, and thus the resultant all-solid-state cell is capable of charge and discharge operations even in the all solid state.

Furthermore, in the present invention, the above described advantageous effects can be achieved, and the battery properties can be improved.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE INVENTION

An embodiment of the solid electrolyte and the all-solid-state cell of the present invention will be described below with reference to FIGS. 1 to 14B.

Figure 1:
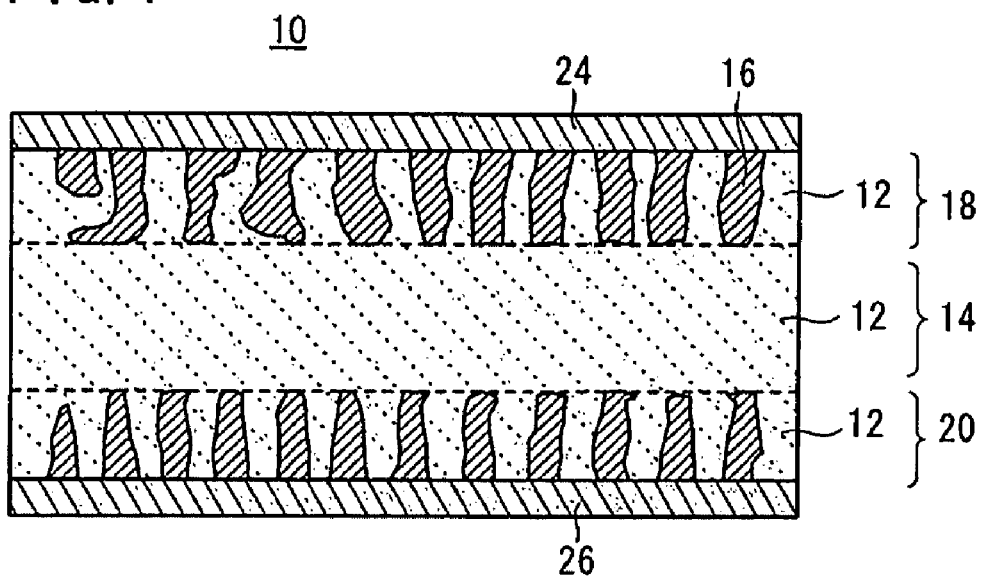
FIG. 1 is a schematic cross-sectional view showing a structure of an all-solid-state cell according to an embodiment of the present invention.

As shown in FIG. 1, an all-solid-state cell 10 according to this embodiment comprises a combination of an electrode active substance and a solid electrolyte. The all-solid-state cell 10 has a fired solid electrolyte body 14 composed of a ceramic containing a solid electrolyte 12, a first electrode layer 18 (e.g. a positive electrode) integrally formed on one surface of the fired solid electrolyte body 14 by mixing and firing an electrode active substance 16 and a solid electrolyte 12, a second electrode layer 20 (e.g. a negative electrode) integrally formed on the other surface of the fired solid electrolyte body 14 by mixing and firing an electrode active substance 16 and a solid electrolyte 12, a first collector electrode 24 electrically connected to the first electrode layer 18, and a second collector electrode 26 electrically connected to the second electrode layer 20.

In the all-solid-state cell 10, the fired solid electrolyte body 14 substantially acts as a solid electrolyte portion separating the positive and negative electrodes. The solid electrolyte 12 contained in the ceramic of the fired solid electrolyte body 14 is not particularly limited, and may be selected from known conventional solid electrolytes. The solid electrolyte 12 preferably contains a lithium ion as a movable ion, and examples thereof include lithium ion-conductive solid glass electrolytes such as $Li_3PO_4$, LiPON ($Li_3PO_4$ mixed with nitrogen), $Li_2S$—$SiS_2$, $Li_2S$—$P_2S_5$, and $Li_2S$—$B_2S_3$, and lithium ion-conductive solid electrolytes prepared by doping the glass with a lithium halide (e.g. LiI) or a lithium oxoate (e.g. $Li_3PO_4$). The solid electrolyte 12 is particularly preferably a titanium oxide type solid electrolyte containing lithium, titanium, and oxygen, such as $Li_xLa_yTiO_3$ ($0 \leq x \leq 1$, $0 \leq y \leq 1$), or a Nasicon type phosphate compound such as $Li_{1+x}Al_xGe_{2-x}(PO_4)_3$ or $Li_{1+x}Al_xTi_{2-x}(PO_4)_3$ ($0 \leq x \leq 1$), which can exhibit a stable performance even in the case of firing under an oxygen atmosphere.

The thickness of the fired solid electrolyte body 14 is not particularly limited, and is preferably 5 µm to 1 mm, more preferably 5 to 100 µm.

In the first electrode layer 18 and the second electrode layer 20, a large number of powder particles of the solid electrolyte 12 are bonded by sintering to form a porous body. In the porous body, a plurality of pores are three-dimensionally connected from the surface to the inside, and are filled with the electrode active substance 16. Such a porous body, formed by bonding the powder particles of the solid electrolyte 12 by the sintering, is also referred to as an electrolyte network.

The thicknesses of the first electrode layer 18 and the second electrode layer 20 are not particularly limited, and are preferably 5 µm to 1 mm, more preferably 5 to 500 µm.

In the formation of the first electrode layer 18 and the second electrode layer 20 on the solid electrolyte body 14, a first paste for the first electrode layer 18 and a second paste for the second electrode layer 20 may be printed on the fired solid electrolyte body 14 by a screen printing method, etc. to form electrode patterns for the first electrode layer 18 and the second electrode layer 20.

The first and second pastes may be prepared by the steps of dissolving a binder in an organic solvent, adding an appropriate amount of the obtained solution to powders of an electrode active substance material and a solid electrolyte material to be hereinafter described, and kneading the resultant mixture.

Then, the electrode patterns of the first and second pastes printed on the fired solid electrolyte body 14 may be fired at a temperature lower than a temperature for forming the fired solid electrolyte body 14, to form the first electrode layer 18 and the second electrode layer 20. The obtained first electrode layer 18 and second electrode layer 20 are the porous bodies having a large number of pores filled with the electrode active substance 16. Particularly in this embodiment, the electrode patterns are fired under an applied pressure to form the first electrode layer 18 and the second electrode layer 20. In this case, the resultant electrode layers can have an internal resistance 1-digit lower than that of an electrode layer formed without applying the pressure. Particularly, the resultant electrode layers can have an interface charge transfer resistance (a resistance at the interface between the active substance and the electrolyte) approximately 2-digits lower than that of an electrode layer formed without applying the pressure. It is conceivable that densification of the first electrode layer 18 and the second electrode layer 20 is accelerated by the firing under the applied pressure, whereby the interface area between the active substance and the electrolyte is further increased utilizing the surface area of the active substance particles more effectively.

For example, the electrode patterns may be fired under an applied pressure using the following methods.

Thus, a cell precursor containing the fired solid electrolyte body 14 and thereon the first and second pastes may be fired under an applied pressure by using a hot isostatic pressing (HIP) method including subjecting the cell precursor to a thermal treatment at a high temperature while applying an isotropic pressure, or a hot pressing method including placing the cell precursor in a hot press mold and subjecting the mold to a thermal treatment while pressing from above by a punch, etc. In the HIP method, a gas of argon, etc. is preferably used as a pressure medium for applying the isotropic pressure to the cell precursor.

Figure 2:
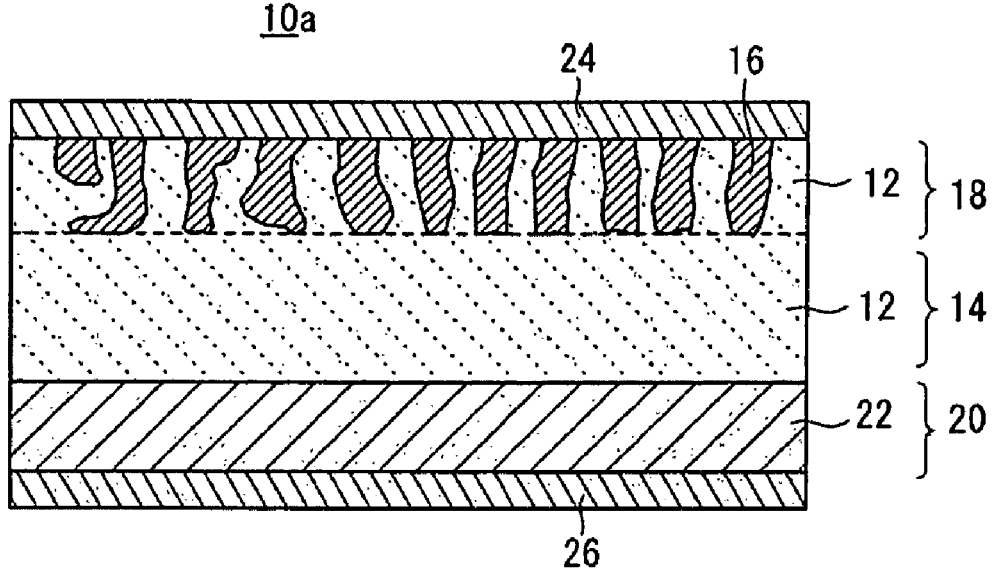
FIG. 2 is a schematic cross-sectional view showing a structure of an all-solid-state cell according to a modification example of the embodiment.

Though both the first electrode layer 18 and the second electrode layer 20 formed on the fired solid electrolyte body 14 are composed of a ceramic containing a mixture of the electrode active substance 16 and the solid electrolyte 12 in the above example, the second electrode layer 20 may be composed of a metal film 22 containing a metal or alloy of Li, etc. like an all-solid-state cell 10a according to another example shown in FIG. 2.

In this embodiment, the solid electrolyte material added to the first electrode layer 18 and the second electrode layer 20 may comprise an amorphous polyanion compound, and the first electrode layer 18 and the second electrode layer 20 may be formed by firing the material.

In this embodiment, the solid electrolyte material added to the first electrode layer 18 and the second electrode layer 20 may comprise an amorphous phosphate compound, and the first electrode layer 18 and the second electrode layer 20 may be formed by firing the material.

The solid electrolyte material comprising the phosphate compound may be of Nasicon type after the firing, and the phosphate compound is particularly preferably LAGP $Li_{1+x}Al_xGe_{2-x}(PO_4)_3$ or LATP $Li_{1+x}Al_xTi_{2-x}(PO_4)_3$ ($0 \leq x \leq 1$).

The electrode active substance material may be a Nasicon type material comprising a phosphate compound, and the phosphate compound is particularly preferably LVP $Li_mV_2(PO_4)_3$ ($1 \leq m \leq 5$).

The positive electrode active substance material may be an olivine type material comprising a phosphate compound, and the phosphate compound is particularly preferably LNP $LiNiPO_4$, LCP $LiCOPO_4$, or LFP $LiFePO_4$.

In this embodiment, the solid electrolyte material and the electrode active substance material comprising the phosphate compound may be of Nasicon type after the firing. In this case, it is preferred that the solid electrolyte material comprises LAGP $Li_{1+x}Al_xGe_{2-x}(PO_4)_3$ ($0 \leq x \leq 1$, preferably $0.3 \leq x \leq 0.7$), and both the positive and negative electrode active substance materials comprise LVP $Li_mV_2(PO_4)_3$ ($1 \leq m \leq 5$), whereby the all-solid-state cell has a symmetrical structure.

Thus, in this embodiment, in the first electrode layer 18 and the second electrode layer 20 of the all-solid-state cell 10, the particle boundary resistance between the solid electrolyte particles can be lowered while preventing formation of a heterophase due to a reaction between the solid electrolyte material and the electrode active substance 16.

Furthermore, in this embodiment, the electrolyte network can be formed in the first electrode layer 18 and the second electrode layer 20, whereby the connection interface area between the electrode active substance 16 and the solid electrolyte 12 can be remarkably increased to lower the interface reaction resistance, and thus the resultant all-solid-state cell 10 is capable of charge and discharge operations even in the all solid state.

Particularly in the case of using LVP in the electrode active substance material, it is preferred that the process of firing the electrode patterns of the first and second pastes is started under an oxygen-containing atmosphere. Further, it is preferred that the process of firing the electrode patterns is carried out under a firing atmosphere with variable oxygen density. When the firing is carried out while maintaining a high oxygen density, the electrode active substance material generates a heterophase. Therefore, the oxygen density of the firing atmosphere is preferably lowered with time.

The first electrode layer 18 and/or the second electrode layer 20 may be formed by firing the printing paste. In this case, a binder component can be carbonized to ensure the electron conductivity of the first electrode layer 18 and/or the second electrode layer 20. Thus, the electron conductivity of the first electrode layer 18 and/or the second electrode layer 20 can be improved without intentional addition of a carbon component as an electron conducting aid.

First Example

First Example of the all-solid-state cell 10 according to the embodiment will be described in detail below.

In First Example, the following Nasicon type phosphate compounds were used in a solid electrolyte material and an electrode active substance material.

Solid electrolyte material: LAGP $Li_{1.5}Al_{0.5}Ge_{1.5}(PO_4)_3$
Electrode active substance material: LVP $Li_3V_2(PO_4)_3$

[Preparation of Crystal Powder]

First, powders of $Li_2CO_3$, $GeO_2$, $Al_2O_3$, and $NH_4H_2(PO_4)_3$ were mixed at the stoichiometric composition ratio and fired at 900° C. in the air, so that a crystal powder of the solid electrolyte material $Li_{1.5}Al_{0.5}Ge_{1.5}(PO_4)_3$ (LAGP) (hereinafter referred to as the LAGP crystal powder) was prepared by a solid-phase synthesis method.

Meanwhile, powders of $Li_2CO_3$, $V_2O_3$, and $NH_4H_2(PO_4)_3$ were mixed at the stoichiometric composition ratio and fired at 930° C. in an Ar flow, so that a crystal powder of the positive (negative) electrode active substance $Li_3V_2(PO_4)_3$ (LVP) (hereinafter referred to as the LVP crystal powder) was prepared by a solid-phase synthesis method.

[Production of Fired Solid Electrolyte Body]

The above obtained LAGP crystal powder was press-formed using a mold into a compact powder pellet having a diameter of 16 mm and a thickness of approximately 1 mm. The pressure for the forming was 500 kg/cm². The pellet was fired at 840° C. in the air to obtain a fired solid electrolyte pellet of LAGP.

[Preparation of Glass Powder (Vitrification of LAGP Solid Electrolyte)]

Figure 3:
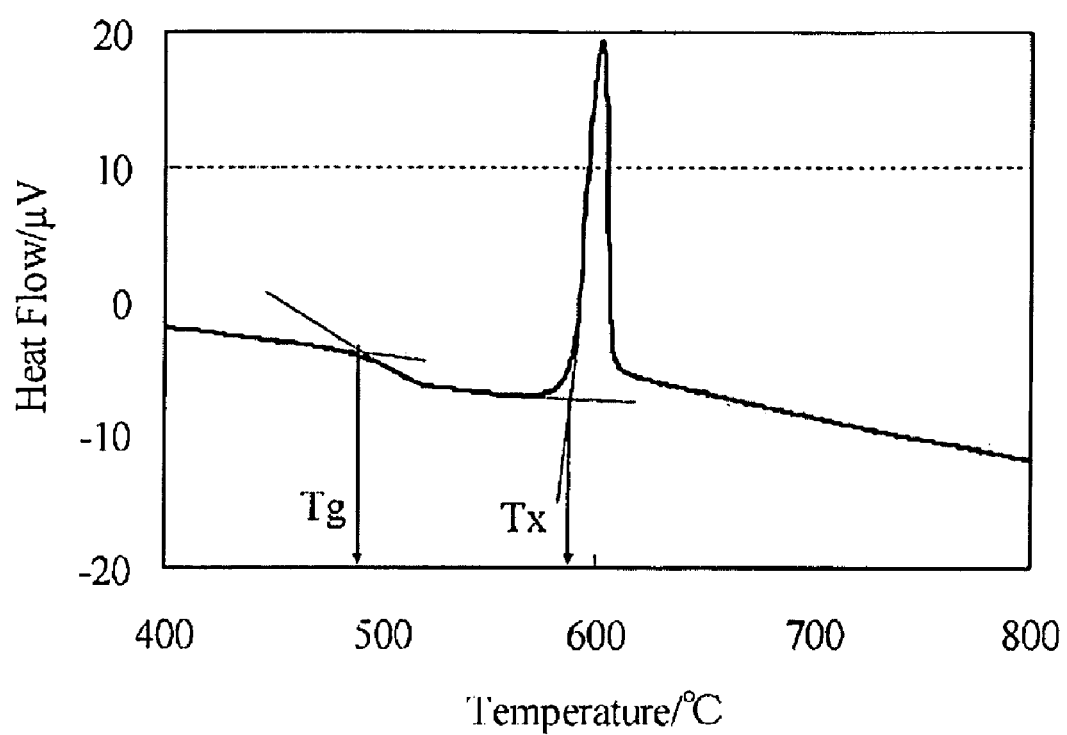
FIG. 3 is a graph showing a DTA (differential thermal analysis) property of a vitrified LAGP solid electrolyte.

The LAGP crystal powder obtained by the solid-phase method was put in a Pt crucible and placed for 1 hour in an air furnace heated at 1200° C. Then, the LAGP crystal powder was taken out and rapidly cooled by iced water, to obtain a vitrified LAGP. The vitrified LAGP was pulverized using a mortar, a ball mill, etc. to prepare a fine LAGP glass powder. A DTA (differential thermal analysis) property of the vitrified LAGP solid electrolyte in an inert atmosphere ($N_2$ atmosphere) was evaluated for confirmation. The property is shown in FIG. 3. It is clear from FIG. 3 that the vitrified LAGP solid electrolyte had low transition temperatures, Tg (glass transition point) of approximately 480° C. and Tx (crystallization temperature) of approximately 590° C.

[Production of All-Solid-State Cell]

Comparative Example 1

A binder was dissolved in an organic solvent, and an appropriate amount of the resultant solution was added to the LAGP glass powder and the LVP crystal powder. The mixture was kneaded in a mortar to prepare an electrode paste for screen printing. The obtained electrode paste was printed into an electrode pattern having a diameter of 12 mm on each surface of a fired solid electrolyte body (a base) having a diameter of 13 mm and a thickness of 1 mm. The printed electrode patterns were dried to form positive and negative electrodes.

The electrodes were bonded to the surfaces of the solid electrolyte base by firing at 600° C. for 40 hours using a firing furnace under an Ar atmosphere.

Then, a sputtered gold (Au) film having a thickness of approximately 500 angstroms was formed as a collector on each surface of the resultant fired body.

After the firing, the positive electrode had a thickness of approximately 20 μm and an active substance content of approximately 2 mg. The charge-discharge capacity per unit weight of the positive electrode was calculated from the active substance content, and was shown in a graph.

Figure 4:
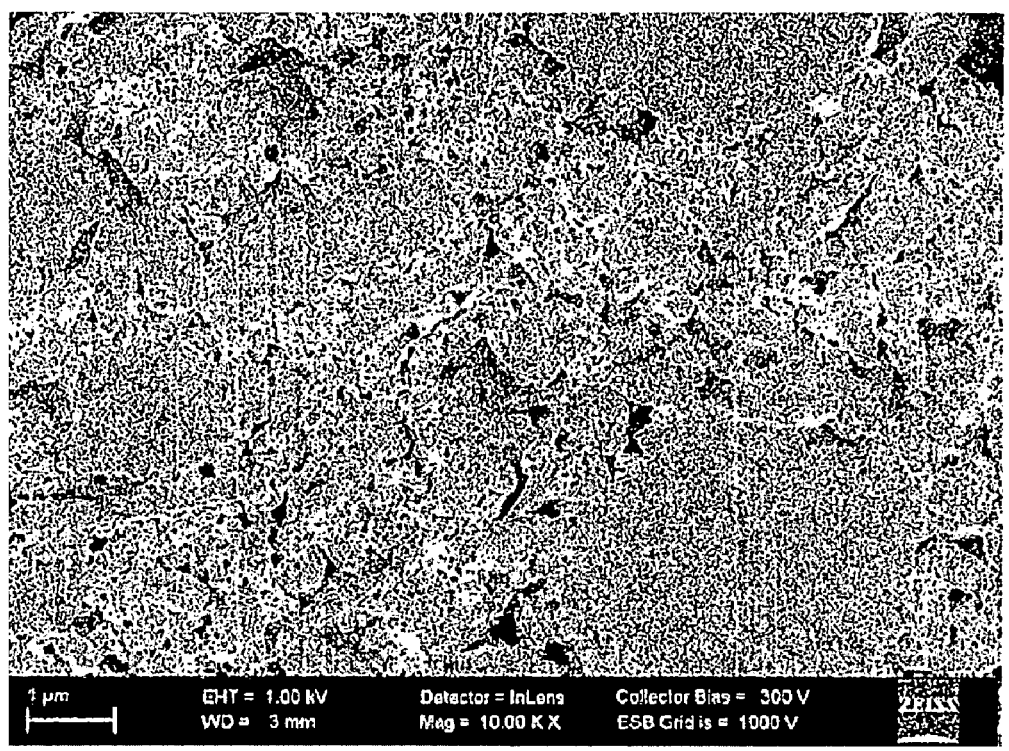
FIG. 4 is a view (photograph) showing a cross section structure of a fired positive electrode according to Comparative Example 1.

A cross sectional structure of the fired positive electrode according to Comparative Example 1 is shown in FIG. 4.

Example 1

A binder was dissolved in an organic solvent, and an appropriate amount of the resultant solution was added to the LAGP glass powder and the LVP crystal powder. The mixture was kneaded in a mortar to prepare an electrode paste for screen printing. The obtained electrode paste was printed into an electrode pattern having a diameter of 12 mm on each surface of a fired solid electrolyte body (a base) having a diameter of 13 mm and a thickness of 1 mm. The printed electrode patterns were dried to form positive and negative electrodes, and thus a cell precursor was obtained.

The electrodes were bonded to the surfaces of the solid electrolyte base by firing at 600° C. for 40 hours using a firing furnace under an Ar atmosphere. Particularly, in Example 1, the cell precursor was placed in a hot press mold, and the hot press mold was subjected to a thermal treatment while pressing the cell precursor under a load of 500 kg/cm² in the thickness direction of the solid electrolyte base, to bond the electrodes to the surfaces of the solid electrolyte base.

After the firing, the positive electrode had a thickness of approximately 30 μm and an active substance content of approximately 4 mg.

Figure 5:
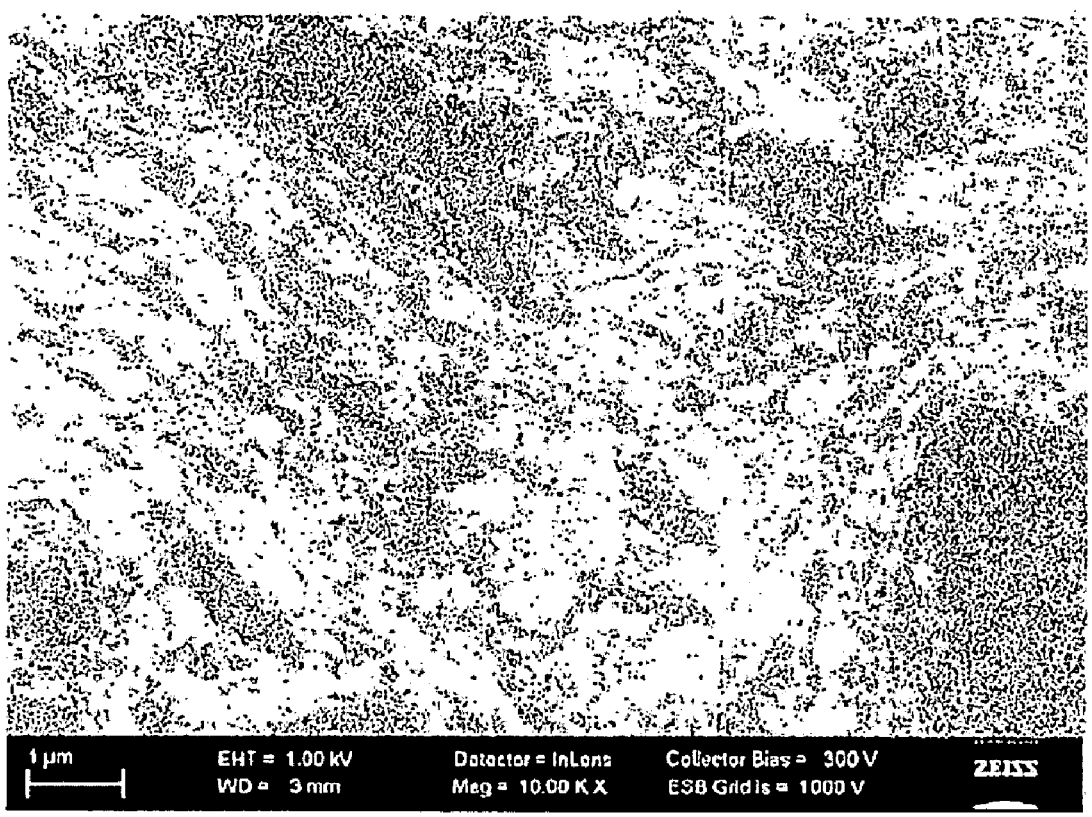
FIG. 5 is a view (photograph) showing a cross section structure of a fired positive electrode according to Example 1.

A cross sectional structure of the fired positive electrode according to Example 1 is shown in FIG. 5.

[Measurement of Alternating-Current Impedance]

The alternating-current impedance of Comparative Example 1 was measured by using 1287 Potentiostat/Galvanostat (trade name) and 1255B Frequency Response Analyzer (trade name) manufactured by Solartron in combination. The measurement frequency was controlled within the range of 1 MHz to 0.1 Hz, and the measurement signal voltage was 10 mV.

The alternating-current impedance of Example 1 was measured by using AUTOLAB Potentiostat/Galvanostat (trade name) and Frequency Response Analyzer (trade name) manufactured by Interchemie in combination. The measurement frequency was controlled within the range of 1 MHz to 0.1 Hz, and the measurement signal voltage was 10 mV.
[Evaluation of Charge-Discharge Property]

Each all-solid-state cell was charged and discharged by a CCCV (Constant Current Constant Voltage) process, and the charge-discharge property was evaluated. Specifically, in Comparative Example 1, the all-solid-state cell was charged at a constant current of 9 µA/cm$^2$ to a cutoff voltage of 2.4 V and then charged at a constant voltage of 2.4 V to a current value of 0.9 µA/cm$^2$, and was discharged at a constant current of 9 µA/cm$^2$ to a cutoff voltage of 0.1 V and then discharged at a constant voltage of 0.1 V to a current value of 0.9 µA/cm$^2$. In Example 1, the all-solid-state cell was charged at a constant current of 90 µA/cm$^2$ to a cutoff voltage of 2.4 V and then charged at a constant voltage of 2.4 V to a current value of 0.9 µA/cm$^2$, and was discharged at a constant current of 90 µA/cm$^2$ to a cutoff voltage of 0.1 V and then discharged at a constant voltage of 0.1 V to a current value of 0.9 µA/cm$^2$.
(Evaluation)

Figure 6:
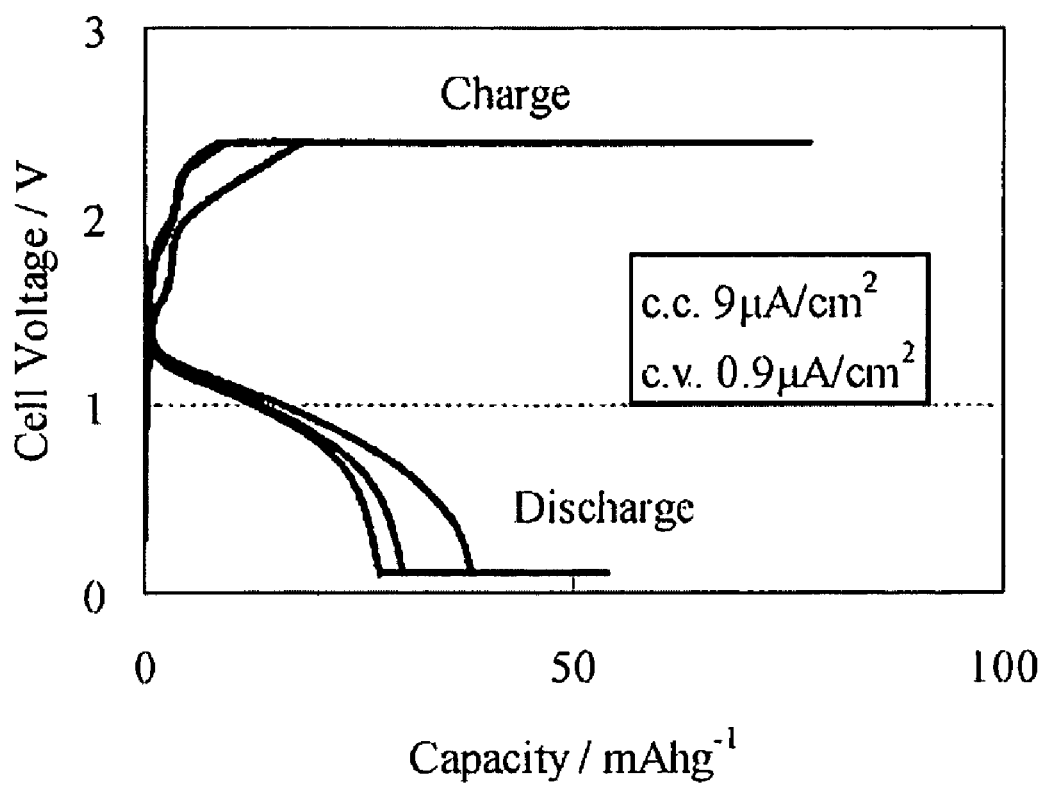
FIG. 6 is a graph showing the charge-discharge property of Comparative Example 1 using an LAGP glass powder.
Figure 7:
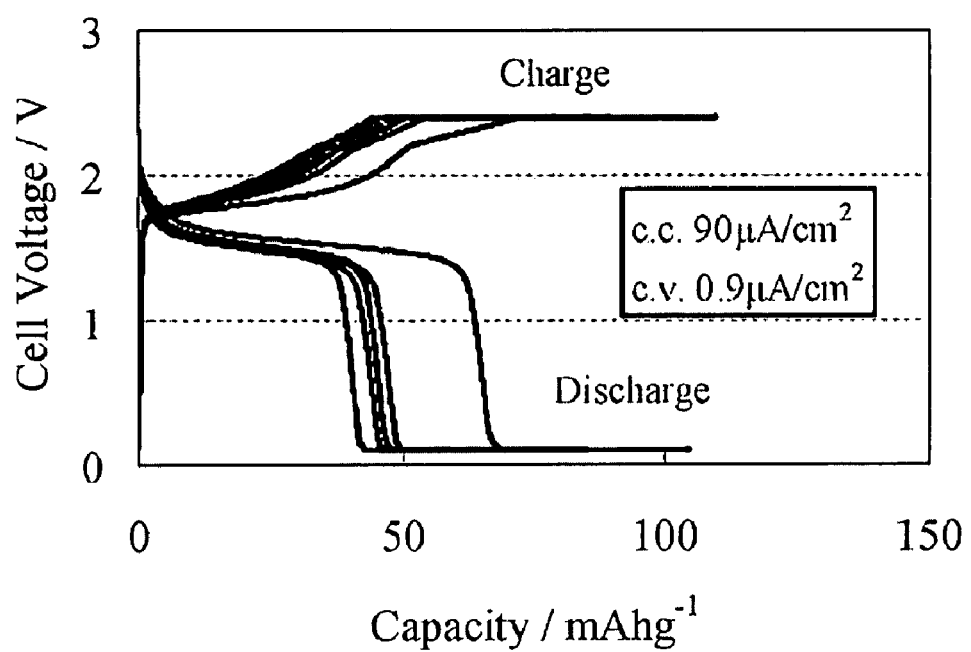
FIG. 7 is a graph showing the charge-discharge property of Example 1 using an LAGP glass powder and hot pressing.
Figure 8:
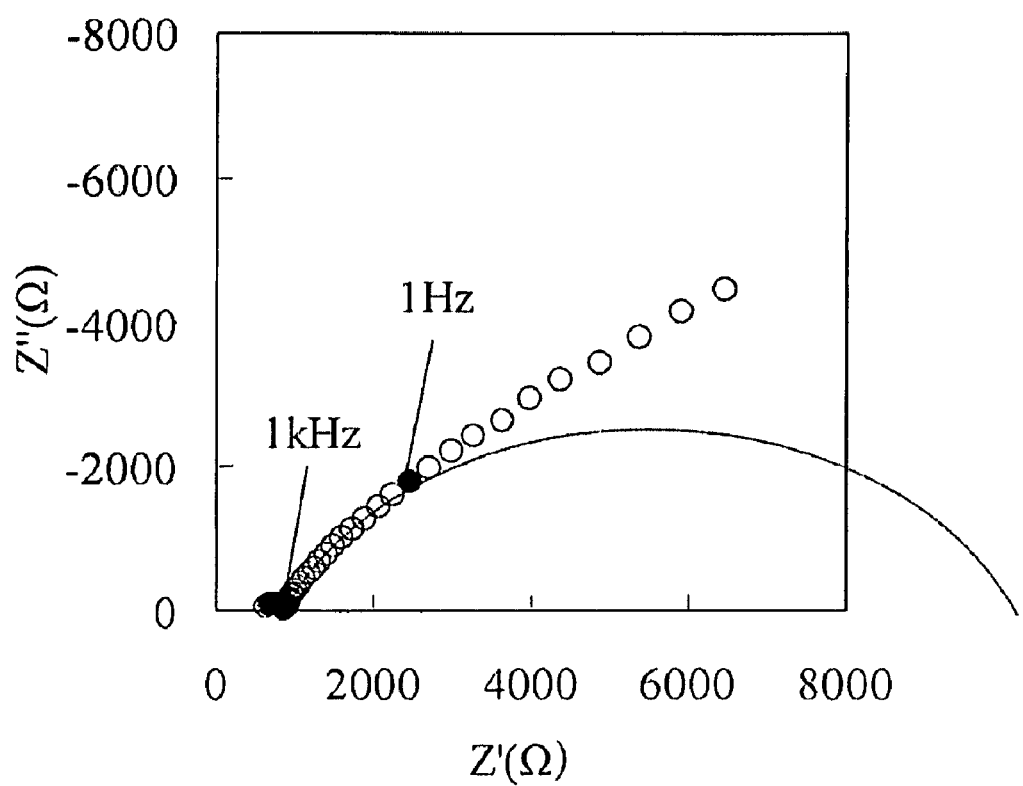
FIG. 8 is a graph showing the alternating-current impedance property of Comparative Example 1.
Figure 9:
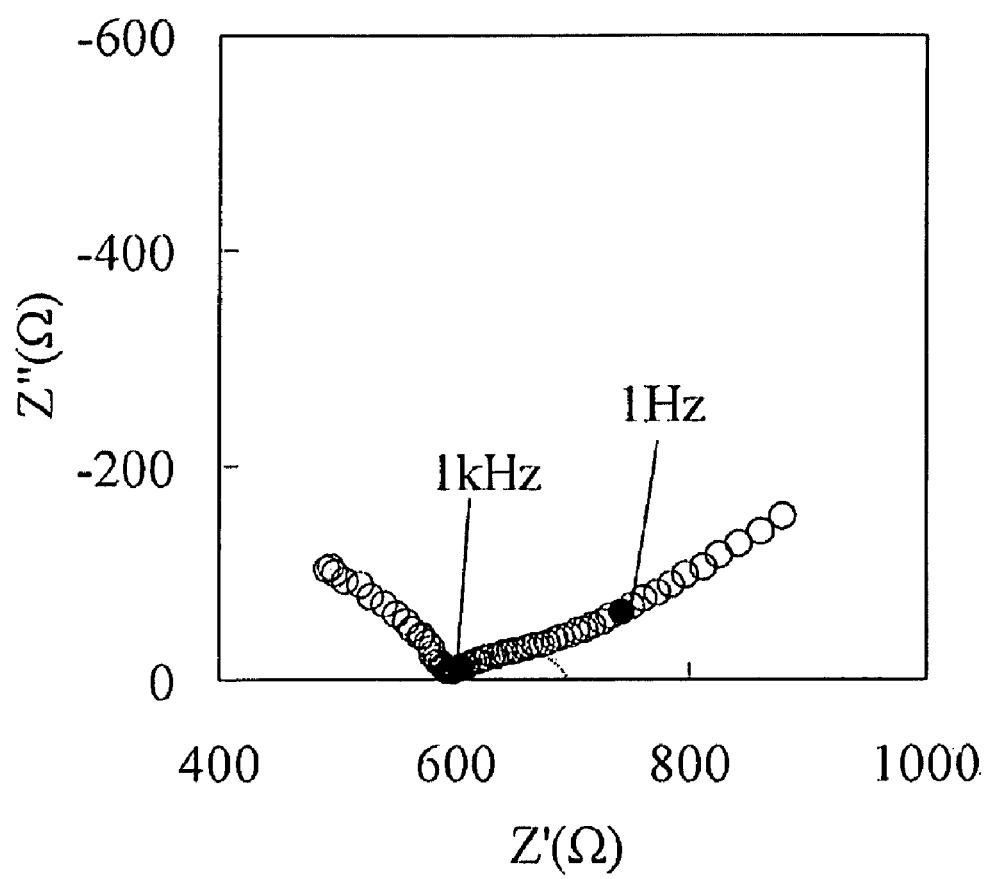
FIG. 9 is a graph showing the alternating-current impedance property of Example 1.

Each of the produced all-solid-state ceramic cells having the mixture electrodes was vacuum-dried under heating, and incorporated in a 2032 coin cell type package to evaluate the electric properties in a glove box. The charge-discharge properties of Comparative Example 1 and Example 1 are shown in FIGS. 6 and 7. The alternating-current impedances of Comparative Example 1 and Example 1 are shown in FIGS. 8 and 9. In each alternating-current impedance waveform, the transverse axis indicates the real part Z' of the impedance, the ordinate axis indicates the imaginary part Z" of the impedance, and the measurement frequencies of 1 kHz and 1 Hz are marked with black dots.

Figure 10:
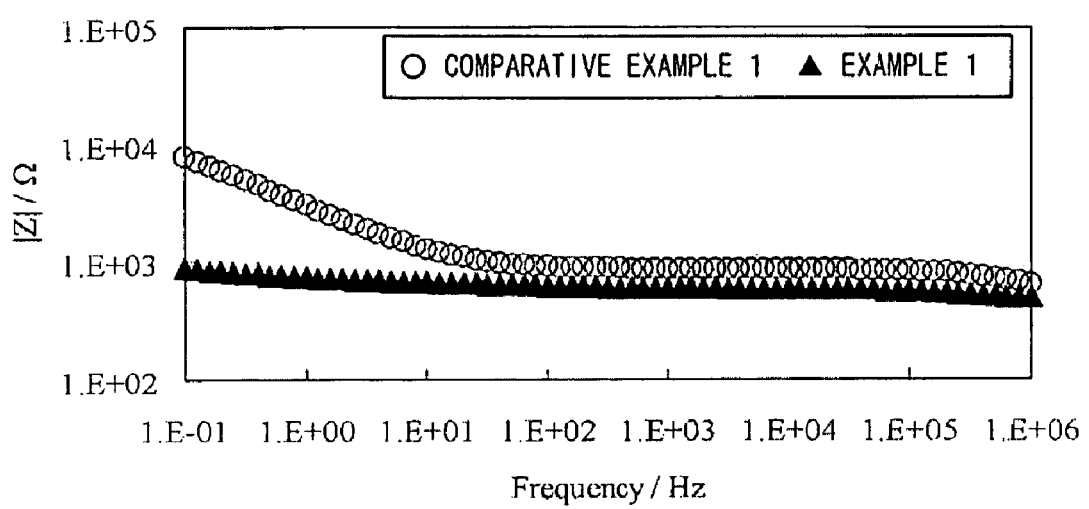
FIG. 10 is a graph showing the internal impedance changes of Comparative Example 1 and Example 1 with respect to frequency.

The internal impedance changes of Comparative Example 1 and Example 1 with respect to frequency are shown in FIG. 10. In FIG. 10, the change of Comparative Example 1 is represented by white dots, and the change of Example 1 is represented by black triangles.
(Consideration)

In terms of charge-discharge capacity, the all-solid-state cell of Comparative Example 1 had a high internal resistance and a charge-discharge property as low as approximately 40 mAh/g. An arc corresponding to the charge transfer resistance at the interface between the electrode active substance and the solid electrolyte was formed at frequency of 1 kHz or less in the alternating-current impedance waveform. The interface charge transfer resistance was presumed to be about 10 kΩ by fitting. This means that the interface area between the electrode active substance and the solid electrolyte was small in the electrode layer.

In contrast, in Example 1, particularly the impedance in a frequency region of 0.1 Hz to 1 kHz, which corresponds to the charge transfer resistance at the interface between the electrode active substance and the solid electrolyte (and a diffusion resistance partly), was remarkably lowered as shown in FIG. 10, as compared with Comparative Example 1. This reduction is considered to be due to densification based on comparison of the cross sectional structure of Example 1 (see FIG. 5) with the cross sectional structure of Comparative Example 1 (see FIG. 4).

The internal resistance of Example 1 was lower than that of Comparative Example 1. This internal resistance reduction consists mostly of the reduction of the interface charge transfer resistance in the internal resistance. Thus, the connection interface area between the electrode active substance and the solid electrolyte may be increased by the densification to lower the internal resistance.

Second Example

An electrode precursor was prepared in the same manner as Example 1. All-solid-state cells were produced by firing the electrode precursor respectively, using various oxygen densities at the start of firing. Then, the charge-discharge property of each all-solid-state cell was evaluated.

The oxygen densities at the start of firing were 0%, 4%, 10%, and 16%.

Before the firing, air in a firing furnace was replaced by an Ar (argon) gas under vacuum. The oxygen density was controlled by changing the amount of the replacement gas, specifically by changing the time of the Ar gas introduction (flow time) before the firing. The firing furnace had an internal size of a width (W) of 360 mm, a height (H) of 420 mm, and a depth (D) of 280 mm.

After the start of the firing (the firing profiling), the firing was carried out in an Ar flow at 0.3 L/min. The firing temperature was increased from the room temperature to 600° C. at a rate of 200° C./hour. When the firing temperature reached 600° C., this temperature was maintained for 40 hours.

Example 11

Figure 11A:
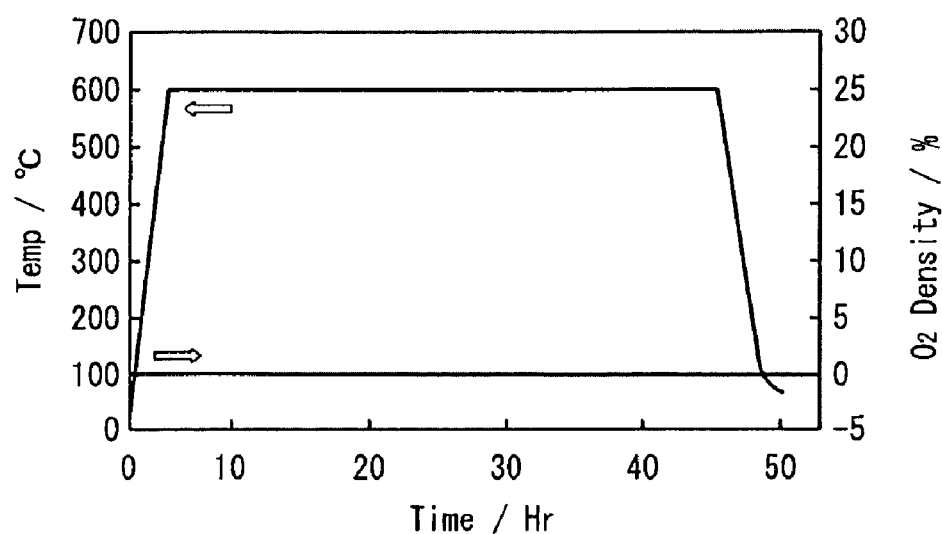
FIG. 11A is a graph showing the firing temperature profile of Example 11.
Figure 11B:
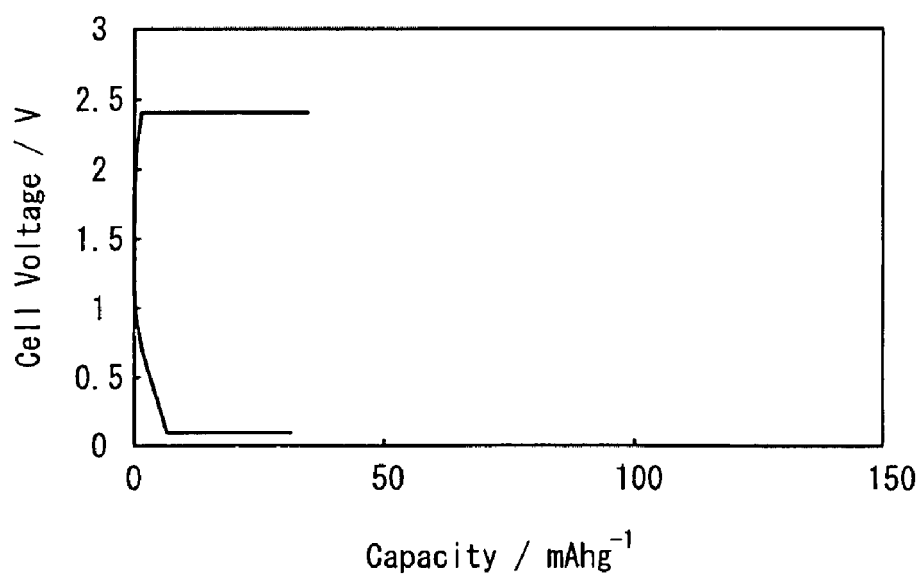
FIG. 11B is a graph showing the charge-discharge property of Example 11.

The atmosphere in the firing furnace had an oxygen density of 20% at the air level, and the Ar gas was introduced thereinto at 0.3 L/min. When the oxygen density in the firing furnace was reduced to 0% as shown in FIG. 11A, the firing was started. The charge-discharge property of Example 11 is shown in FIG. 11B. As is clear from FIG. 11B, the cell exhibited a low discharge inception voltage, and the cell voltage was rapidly reduced after the start of the discharge. The cell had only a low discharge capacity of approximately 30 mAh/g in total of reduction region and constant discharge region.

Example 12

Figure 12A:
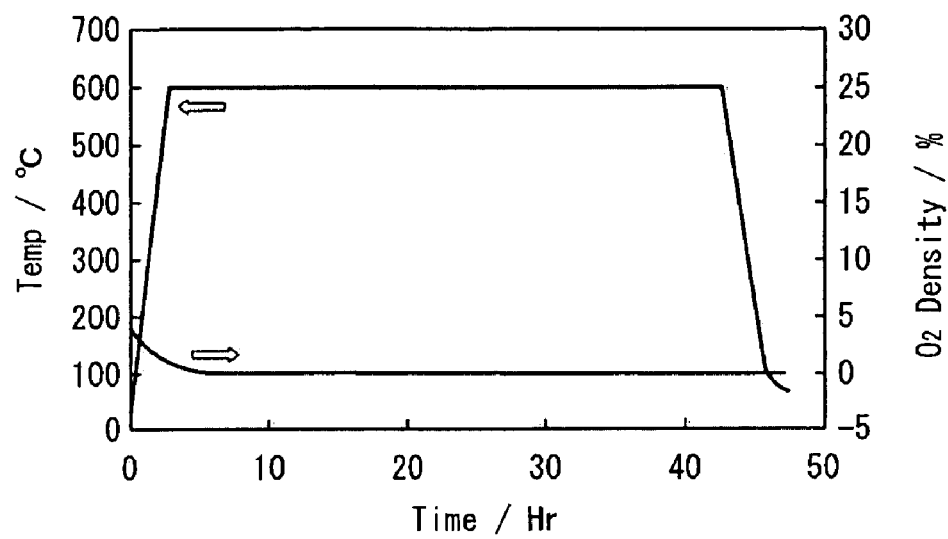
FIG. 12A is a graph showing the firing temperature profile of Example 12.
Figure 12B:
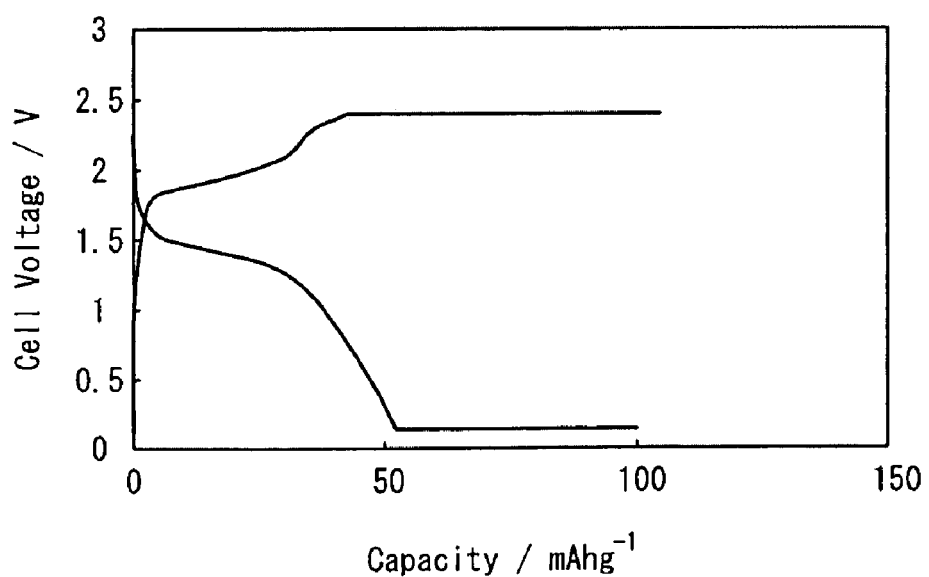
FIG. 12B is a graph showing the charge-discharge property of Example 12.

The atmosphere in the firing furnace had an oxygen density of 20% at the air level, and the Ar gas was introduced thereinto at 0.3 L/min. When the oxygen density in the firing furnace was reduced to 4% as shown in FIG. 12A, the firing was started. The charge-discharge property of Example 12 is shown in FIG. 12B. As is clear from FIG. 12B, the cell exhibited a discharge inception voltage higher than that of Example 11. The cell voltage was maintained at approximately 1.5 V after the start of discharge within a discharge capacity range of approximately 30 mAh/g or less. The cell voltage was gradually reduced, and then became constant. The cell had a discharge capacity of 100 mAh/g in total.

Example 13

Figure 13A:
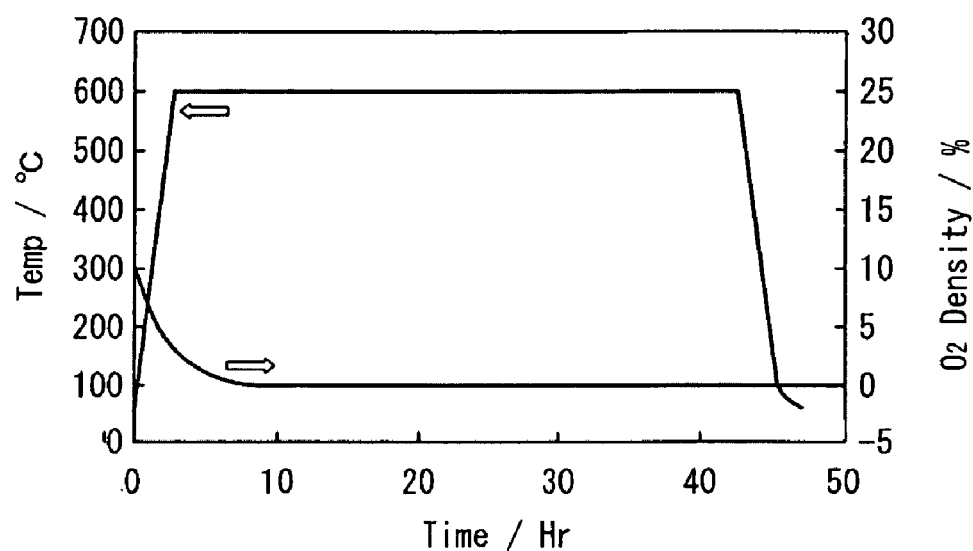
FIG. 13A is a graph showing the firing temperature profile of Example 13.
Figure 13B:
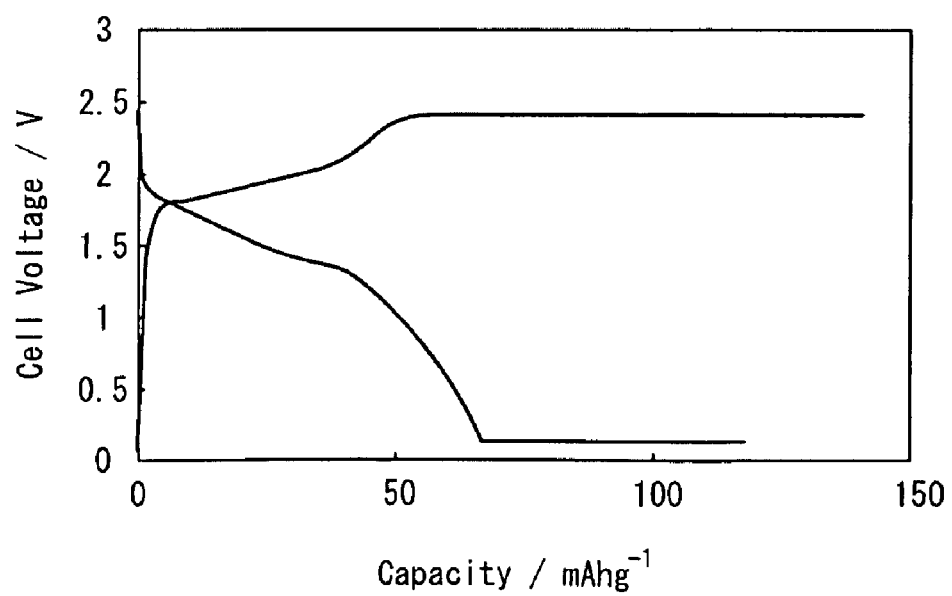
FIG. 13B is a graph showing the charge-discharge property of Example 13.

The atmosphere in the firing furnace had an oxygen density of 20% at the air level, and the Ar gas was introduced thereinto at 0.3 L/min. When the oxygen density in the firing furnace was reduced to 10% as shown in FIG. 13A, the firing was started. The charge-discharge property of Example 13 is shown in FIG. 13B. As is clear from FIG. 13B, the constant current discharge capacity was increased to 60 mAh/g, and also the discharge potential was increased. As a result, the cell had a discharge capacity of 110 mAh/g in total of reduction region and constant discharge region.

Example 14

Figure 14A:
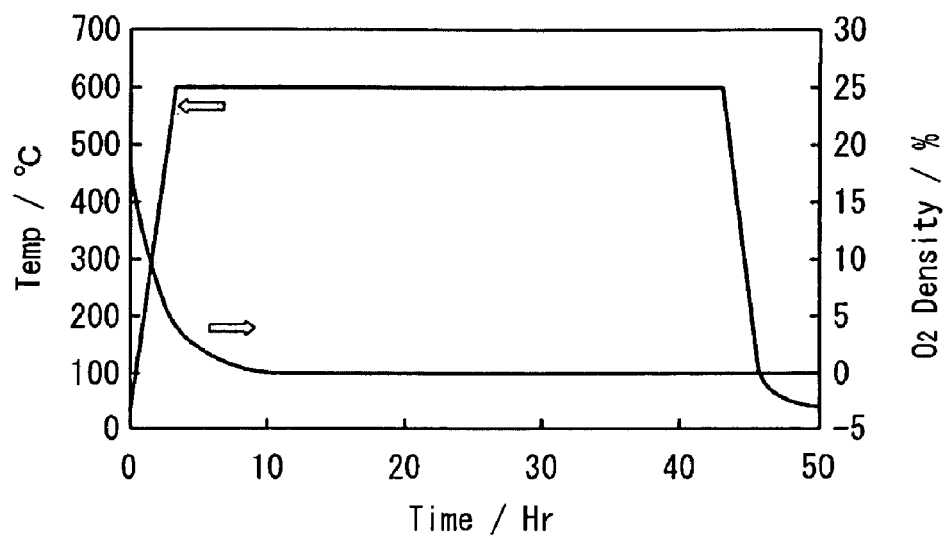
FIG. 14A is a graph showing the firing temperature profile of Example 14.
Figure 14B:
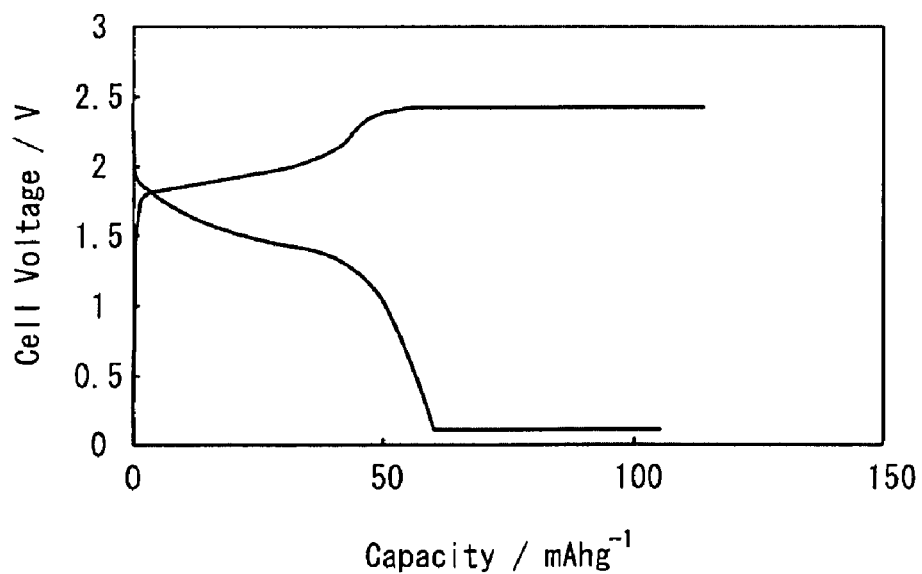
FIG. 14B is a graph showing the charge-discharge property of Example 14.

The atmosphere in the firing furnace had an oxygen density of 20% at the air level, and the Ar gas was introduced thereinto at 0.3 L/min. When the oxygen density in the firing furnace was reduced to 16% as shown in FIG. 14A, the firing was started. The charge-discharge property of Example 14 is shown in FIG. 14B. As is clear from FIG. 14B, the cell had an average potential higher than that of Example 13 in the constant current discharge region.

(Consideration)

In the cases where the firing was started under a firing atmosphere containing oxygen ($O_2$), the discharge capacity and the discharge potential were increased, and the battery properties were improved.

The active substance material (LVP) is generally synthesized in an inert atmosphere. It has been found that when the atmosphere has a high residual oxygen density, the material is melted during the synthesis. The synthesis is generally carried out at a temperature of higher than 800° C. The inventors focused attention on this melting property, and thought that the material might be melted even at a lower temperature depending on the oxygen density. As a result of research, it was experimentally clarified that the material can be melted in air at a temperature of 600° C. or higher. However, when the material is exposed to air at the high temperature for an excessively long time, a heterophase of an oxide derived from V (vanadium), specifically $LiVP_2O_7$, is generated. Though also this substance can act as the active substance, it has a theoretical capacity lower than that of LVP in a cell, resulting in deterioration of battery properties. Therefore, it is not preferred that the firing is carried out at the high temperature while maintaining the air atmosphere. In this example, the electrode active substance was softened and melted synergistically by maintaining a high oxygen density only in the initial stage of the firing and by softening and melting the amorphous solid electrolyte material, whereby the electrode layer was densified under a load to improve the properties. Thus, it is conceivable that the melted electrode active substance material (LVP) acted to densify the electrode structure of the all-solid-state cell effectively.

In view of preparing a powder, the melting of the material in the synthesis may be an unsuccessful result. However, the finding of this phenomenon resulted in realization of the densification of the cell electrode structure.

It is to be understood that the all-solid-state cell of the present invention is not limited to the above embodiment, and various changes and modifications may be made therein without departing from the scope of the invention.

What is claimed is:

1. An all-solid-state cell comprising positive and negative electrode portions containing an electrode active substance, an electrolyte portion containing a solid electrolyte, and positive and negative collector portions, wherein
    one or both of the positive and negative electrode portions are formed by firing a mixture of the electrode active substance and the solid electrolyte under an applied pressure of at least 500 kg/cm$^2$.

2. An all-solid-state cell according to claim 1, wherein the solid electrolyte comprises an amorphous polyanion material.

3. An all-solid-state cell according to claim 1, wherein the solid electrolyte comprises an amorphous phosphate material.

4. An all-solid-state cell according to claim 1, wherein the solid electrolyte is made of a material of Nasicon class of materials after the firing.

5. An all-solid-state cell according to claim 1, wherein both the solid electrolyte and the electrode active substance are made of materials of Nasicon class of materials after the firing.

6. An all-solid-state cell according to claim 1, wherein both the solid electrolyte and the electrode active substance are made of materials of Nasicon class of materials after the firing, the solid electrolyte comprises LAGP $Li_{1+x}Al_xGe_{2-x}(PO_4)_3$, wherein x is greater than or equal to 0 and less than or equal to 1, the electrode active substance comprises LVP $Li_mV_2(PO_4)_3$, wherein m is greater than or equal to 1 and less than or equal to 5, in both the positive and negative electrode portions, and the all-solid-state cell has a symmetrical structure.

7. An all-solid-state cell according to claim 6, wherein the process of firing the mixture is started under an oxygen-containing atmosphere.

8. An all-solid-state cell according to claim 6, wherein the process of firing the mixture is carried out under a firing atmosphere with variable oxygen density.

9. An all-solid-state cell according to claim 1, wherein the solid electrolyte comprises an amorphous polyanion material.

10. An all-solid-state cell according to claim 1, wherein the solid electrolyte comprises an amorphous phosphate material.

11. An all-solid-state cell according to claim 1, wherein the mixture is formed into a printing paste.

12. An all-solid-state cell comprising positive and negative electrode portions containing an electrode active substance, an electrolyte portion containing a solid electrolyte, and positive and negative collector portions, wherein
    one or both of the positive and negative electrode portions are formed by firing a mixture of the solid electrolyte and the electrode active substance under an applied pressure of at least 500 kg/cm$^2$, and
    the solid electrolyte and the electrode active substance satisfy the inequality:

$$Ty > Tz$$

wherein Ty is a temperature at which the capacity of the electrode active substance is lowered by a reaction between a solid electrolyte material and an electrode active substance material, and Tz is a temperature at which the solid electrolyte material is shrunk by firing.

13. An all-solid-state cell according to claim 12, wherein Tz is a temperature at which the relative density of the solid electrolyte material is increased to 70% or more of the theoretical density thereof due to the shrinkage by firing.

14. An all-solid-state cell according to claim 12, wherein the solid electrolyte comprises an amorphous polyanion material.

15. An all-solid-state cell according to claim 12, wherein the solid electrolyte comprises an amorphous phosphate material.

16. An all-solid-state cell according to claim 12, wherein the solid electrolyte is made of a material of Nasicon class of materials after the firing.

17. An all-solid-state cell according to claim 12, wherein both the solid electrolyte and the electrode active substance are made of materials of Nasicon class of materials after the firing.

18. An all-solid-state cell according to claim 12, wherein both the solid electrolyte and the electrode active substance are made of materials of Nasicon class of materials after the firing, the solid electrolyte comprises LAGP $Li_{1+x}Al_xGe_{2-x}(PO_4)_3$, wherein x is greater than or equal to 0 and less than or equal to 1, the electrode active substance comprises LVP $Li_mV_2(PO_4)_3$, wherein m is greater than or equal to 1 and less than or equal to 5, in both the positive and negative electrode portions, and the all-solid-state cell has a symmetrical structure.

19. An all-solid-state cell according to claim 18, wherein the process of firing the mixture is started under an oxygen-containing atmosphere.

20. An all-solid-state cell according to claim 18, wherein the process of firing the mixture is carried out under a firing atmosphere with variable oxygen density.

21. An all-solid-state cell according to claim 12, wherein the solid electrolyte comprises an amorphous polyanion material.

22. An all-solid-state cell according to claim 12, wherein the solid electrolyte comprises an amorphous phosphate material.

23. An all-solid-state cell according to claim 12, wherein one or both of the positive and negative electrode portions are formed by firing a printing paste containing the mixture.

24. An all-solid-state cell according to claim 1, wherein each of the electrode portions is formed by firing said mixture under an applied pressure of at least 500 kg/cm$^2$ and at a temperature of at least 600° C.

25. An all-solid-state cell according to claim 1, wherein a charge transfer resistance at the interface between said electrode active substance and said electrolyte is less than or equal to 1000 Ω.

26. An all-solid-state cell according to claim 12, wherein each of the electrode portions is formed by firing said mixture under an applied pressure of at least 500 kg/cm$^2$ and at a temperature of at least 600° C.

27. An all-solid-state cell according to claim 12, wherein a charge transfer resistance at the interface between said electrode active substance and said electrolyte is less than or equal to 1000 Ω.

* * * * *